US007147880B2

(12) United States Patent
Lenahan

(10) Patent No.: US 7,147,880 B2
(45) Date of Patent: Dec. 12, 2006

(54) CEREAL PACKAGE

(76) Inventor: Robert F. Lenahan, 3402 River Rd., Point Pleasant, NJ (US) 08742

( * ) Notice: Subject to any disclaimer, the term of this patent is extended or adjusted under 35 U.S.C. 154(b) by 596 days.

(21) Appl. No.: 10/340,149

(22) Filed: Jan. 10, 2003

(65) Prior Publication Data

US 2003/0161915 A1 Aug. 28, 2003

Related U.S. Application Data

(60) Provisional application No. 60/347,628, filed on Jan. 14, 2002.

(51) Int. Cl.
*B65D 85/72* (2006.01)
*B65D 85/00* (2006.01)
*B65D 23/04* (2006.01)

(52) U.S. Cl. .................. 426/115; 426/120; 206/222

(58) Field of Classification Search ............... 426/106, 426/112, 115, 120, 129; 206/219, 222, 221; 229/120.32
See application file for complete search history.

(56) References Cited

U.S. PATENT DOCUMENTS

| | | | | | |
|---|---|---|---|---|---|
| 2,510,211 | A | * | 6/1950 | Cleary | ................ 229/120.32 |
| 3,057,536 | A | * | 10/1962 | Warnsdorfer, Jr. et al. | ................ 229/120.03 |
| 4,061,782 | A | * | 12/1977 | Baxter | ................ 426/86 |
| 5,209,348 | A | * | 5/1993 | Schafer, III | ................ 206/222 |
| 5,384,139 | A | * | 1/1995 | Vasseneix | ................ 426/128 |
| 5,514,394 | A | * | 5/1996 | Lenahan | ................ 426/120 |
| RE35,437 | E | * | 2/1997 | Ascone | ................ 62/372 |
| 5,676,244 | A | * | 10/1997 | Green et al. | ................ 206/221 |
| 5,727,679 | A | * | 3/1998 | Newarski | ................ 206/222 |
| 6,042,858 | A | * | 3/2000 | Kairys | ................ 426/119 |
| 6,089,375 | A | * | 7/2000 | Johnson et al. | ................ 206/541 |

FOREIGN PATENT DOCUMENTS

FR 2670750 A1 * 6/1992

* cited by examiner

*Primary Examiner*—Reginald L. Alexander
(74) *Attorney, Agent, or Firm*—Clifford G. Frayne

(57) ABSTRACT

An improved unitary container having separate compartments which may be used to store two materials, such as milk and cereal. The container is provided with a midportion having compressible side walls and a bisecting wall member which separates the compartments and contents and allows the contents of each to be mixed when so desired by the combination of a pull tab/bladder configuration for the milk and hand pressure, the container having a removable lid in the cereal portion of the package allowing access to the cereal and milk for consumption.

3 Claims, 4 Drawing Sheets

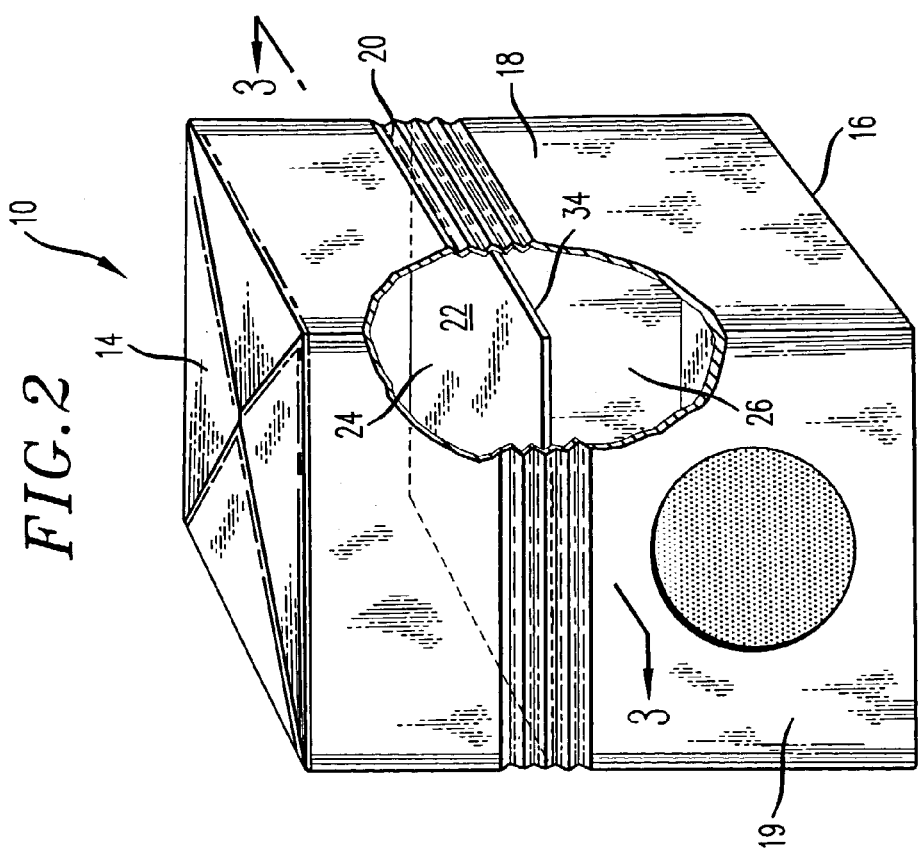
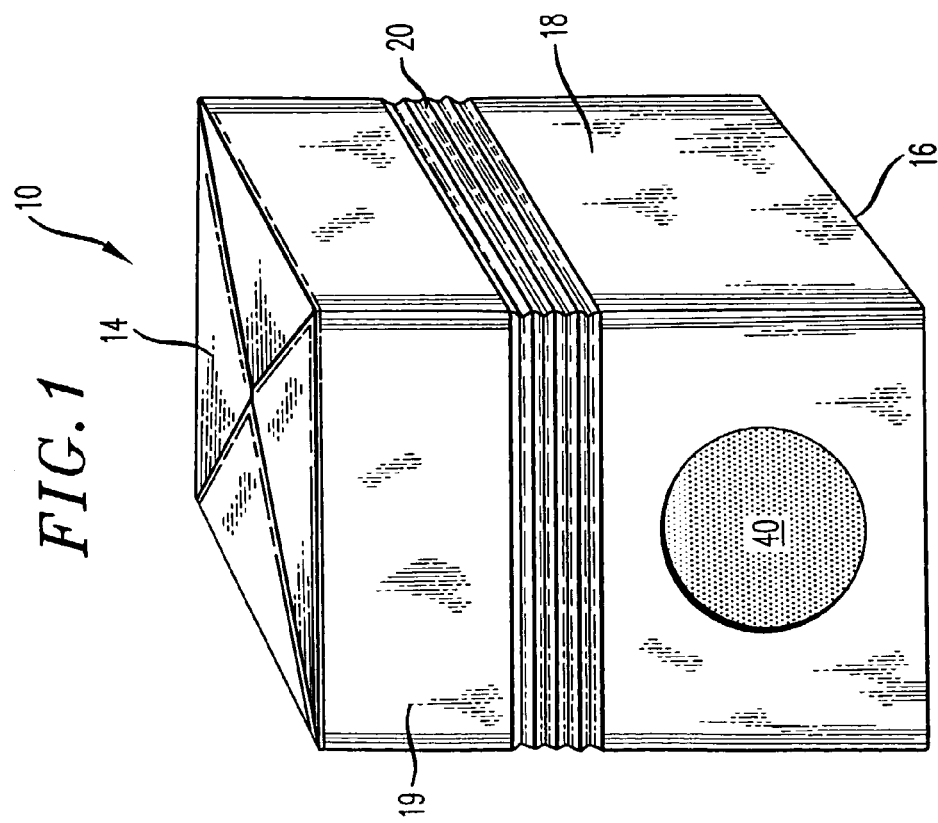

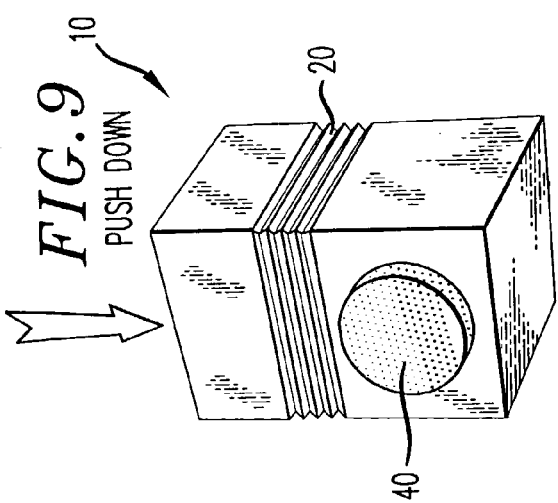
*FIG. 7* LIFT TAB
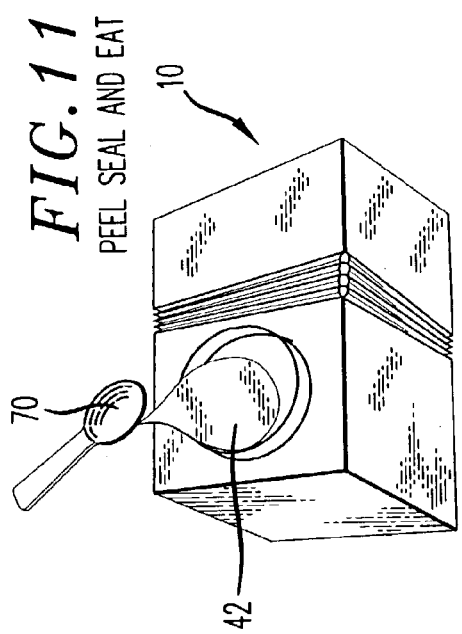
*FIG. 9* PUSH DOWN
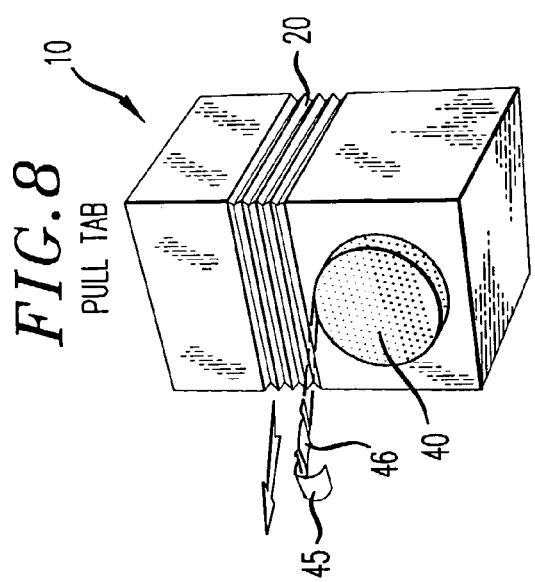
*FIG. 8* PULL TAB
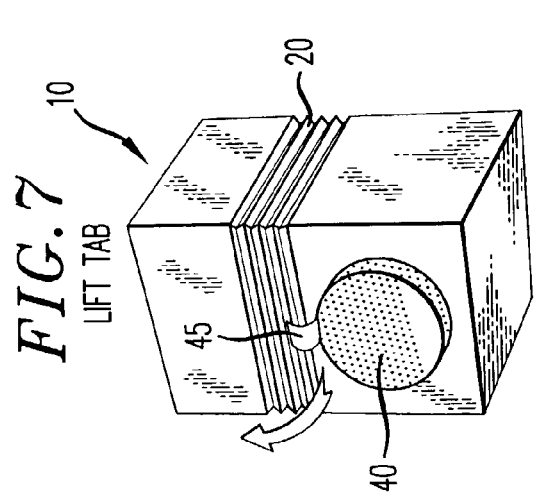
*FIG. 10* LIFT LID
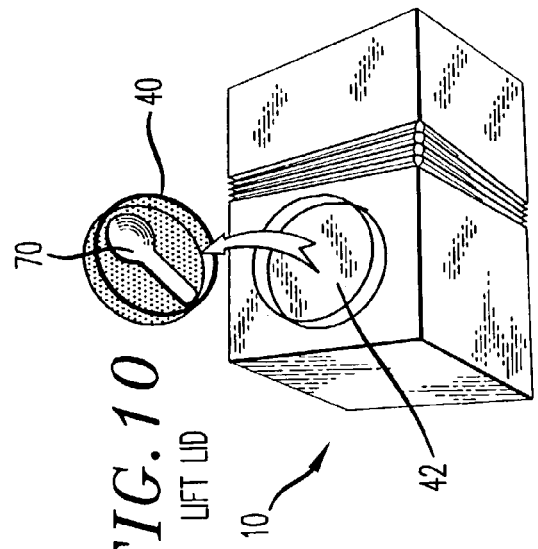
*FIG. 11* PEEL SEAL AND EAT

CEREAL PACKAGE

RELATED APPLICATIONS

Applicant claims the benefit of provisional application Ser. No. 60/347,628, filed Jan. 14, 2002.

BACKGROUND OF THE INVENTION

1. Field of the Invention

The present invention relates to packaging and more particularly, to a packaging apparatus for separately holding two materials or substances, such as cereal and milk, in separate compartments within the same package whereupon, when the user desires, the cereal and milk may be mixed, and the packaging apparatus may be used as a bowl for consumption of the contents.

2. Description of the Prior Art

Breakfast cereal has traditionally been packaged in its own individual box or package without the need for refrigeration in order to store it. However, a bowl and refrigerated milk were needed in order to properly consume the cereal.

Some cereal packages now come with perforated panels which allow the cereal package to be used as a bowl, as well as a cereal container. Also, with the development of UHT field containers, milk may now be stored unrefrigerated for long periods of time. These capabilities allow for cereal and milk to be stored together for long periods of time in the same container without spoiling.

In U.S. Pat. No. 5,167,973 to Synder there is described a milk carton within a kit which may be punctured by the tip of the spoon and thereby release stored milk into a separate cereal compartment within the same kit. Another container is described in U.S. Pat. No. 5,209,348 to Schafer wherein a valve controllably releases milk from one compartment to a containment bowl into the cereal compartment. Other packaging containers are described, for example, in the following U.S. Pat. Nos. 4,927,012 to Rowe; 4,996,823 to Byrne; 5,027,980 to Bell; 5,071,034 to Corbiere; and 5,287,961 to Herran, and 5,514,394 to the Applicant herein. This application is directed to an improved method with respect to the embodiments described in the '394 patent to Applicant, which is incorporated herein by reference.

OBJECTS OF THE INVENTION

An object of the present invention is to provide for a practical, unitary, self-contained cereal and milk package capable of unrefrigerated storage.

It is another object of the present invention to provide for a unitary cereal and milk container which allows the cereal and milk to be combined by a combination of a pull tab and hand pressure.

It is another object of the present invention to provide for the consumption of cereal and milk from the same package.

SUMMARY OF THE INVENTION

An improved unitary container having separate compartments which may be used to store two materials, such as milk and cereal. The container is provided with a midportion having compressible side walls and a bisecting wall member which separates the compartments and contents and allows the contents of each to be mixed when so desired by the combination of a pull tab/bladder configuration for the milk and hand pressure, the container having a removable lid in the cereal portion of the package allowing access to the cereal and milk for consumption.

BRIEF DESCRIPTION OF THE DRAWINGS

These and other objects of the present invention will become evident particularly when taken in light of the following illustrations wherein:

FIG. 1 is a perspective view of the cereal package of the present invention;

FIG. 2 is a perspective view of the cereal package of FIG. 1 with a corner cut away to show the interior of the package;

FIGS. 7 through 11 are perspective views of the cereal package of FIG. 1 illustrating the manner in which it is utilized.

DETAILED DESCRIPTION OF THE DRAWINGS

Figure 3:
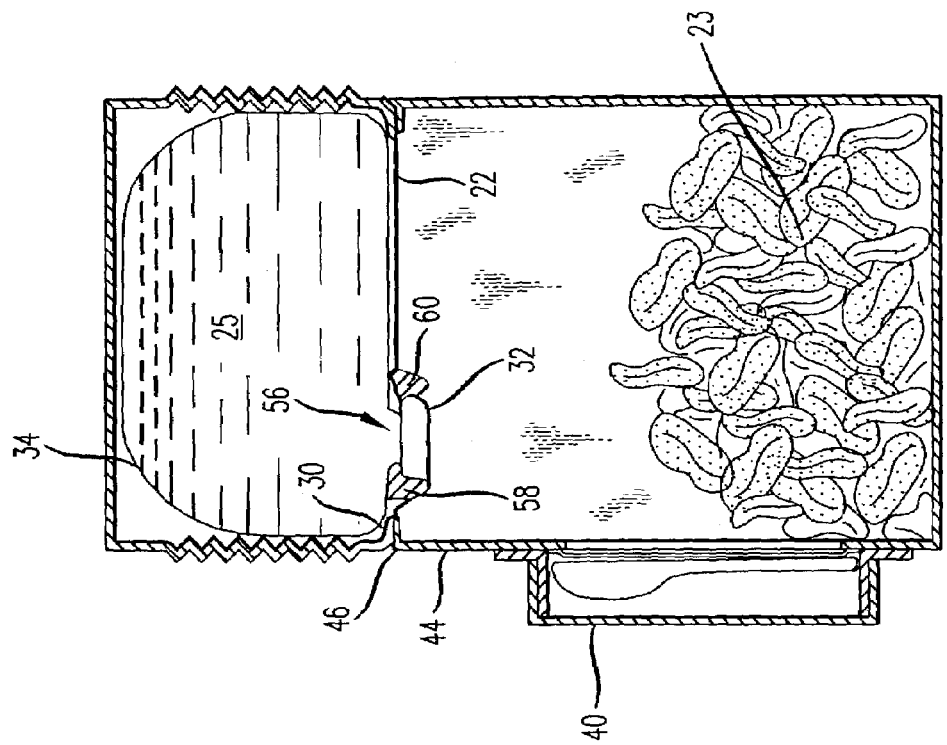
FIG. 3 is a side view of the cereal package of FIG. 1 with one side wall 18 removed to show the interior of the package.
Figure 4:
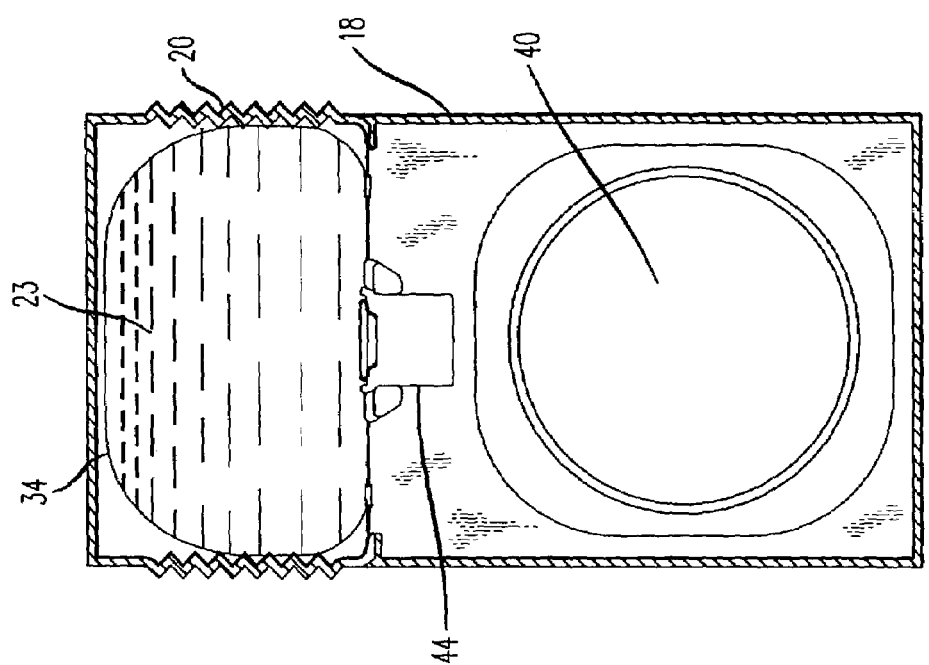
FIG. 4 is a front view of the cereal package of FIG. 1 with the upper portion of front wall 18 removed to show the interior of the milk chamber.
Figure 5:
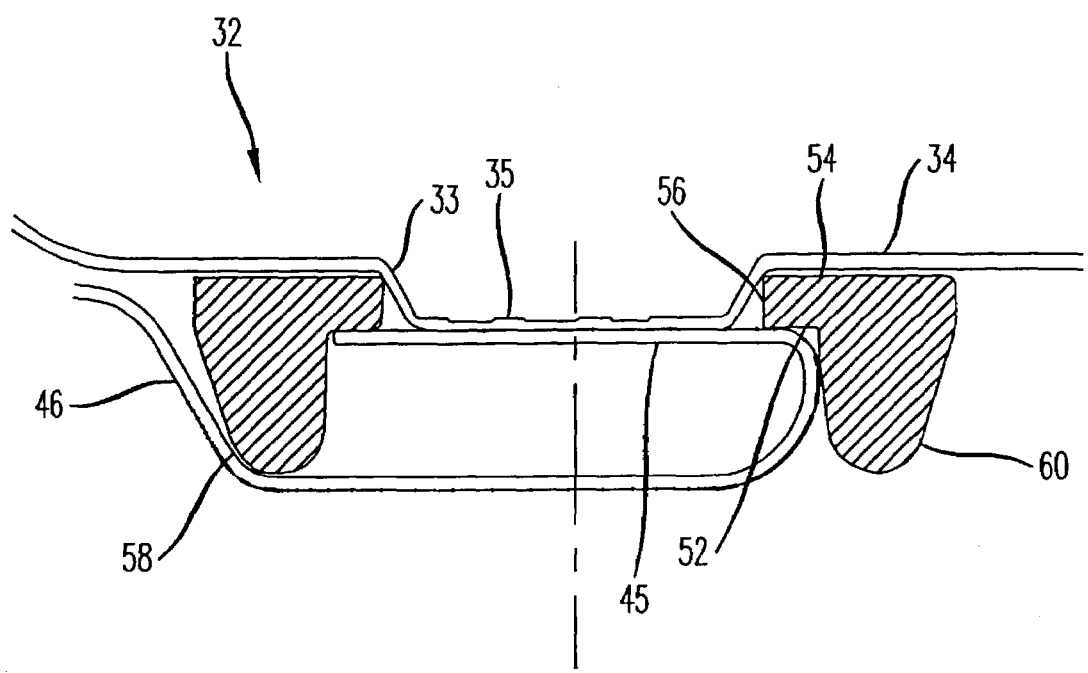
FIG. 5 is a partial enlarged side view of the milk bladder seal assembly.
Figure 6:
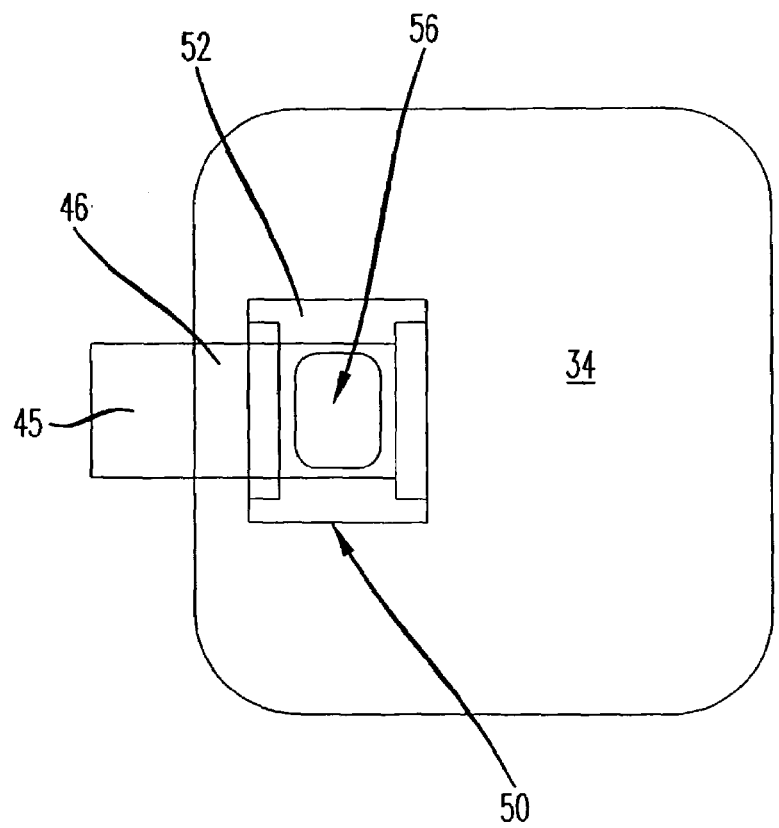
FIG. 6 is a bottom view of the milk bladder.

FIG. 1 illustrates a cereal package 10 of the present invention in the form of a hollow, box-shaped member having top 14, bottom 16, side wall and rear wall members 18, and a front wall member 19. All wall members 18 and 19 are provided with a corrugated rib portion 20 which is capable of being compressed or collapsed together when pressure such as hand pressure is applied to the top member 14 to compress the cereal package 10 downwardly. FIG. 2 is a partial cutaway view of the interior of cereal package 10 showing a separation panel 22 oriented parallel to top 14 and bottom 16, and dividing cereal package 10 into an upper compartment 24 and a lower compartment 26. Separation panel 22 acts to maintain substances such as cereal 23 and milk 25 in each compartment 24, 26, separately, until intermixture is desired. Separation panel 22 has an aperture 30 therethrough which is cooperative with a sealing assembly 32 positioned on milk bladder 34 as described hereafter.

Positioned on front wall member 19 is an access means to the lower compartment 26 which is utilized to access lower compartment 26 after the cereal 23 and milk 25 have been admixed in compartment 26. The access means includes a pop-off cap 40 with an underlying tamper proof seal 42 (see FIG. 11). Also positioned on front wall 19 is a first end 44 of a pull tab member 46 which is cooperative with the milk bladder 34 in order to obtain intermixture of the cereal 23 and milk 25. FIG. 3 is a side view of cereal package 10 with one of the side walls 18 removed. The milk 25 is containerized in a milk bladder 34 which is positioned in compartment 24.

In a first embodiment, milk bladder 34 has a sealing assembly 32 which is positioned in the aperture 30 in separation panel 22. The sealing assembly 32 consists of backing member 50 having a first side 52 and second side 54 and having an aperture 56 therethrough, backing member 50 having two parallel depending flanges 58 and 60 depending from first side 52 of sealing assembly 32. Second side 54 of sealing assembly 32 is secured to milk bladder 34 about an aperture 33 formed therein. Milk bladder 34 is oriented within compartment 24 such that the parallel flanges 58 and 60 on sealing assembly 32 are parallel to front wall member 19 and sealing assembly 32 depends through aperture 30 in separation panel 22. The aperture 56 in backing member 50 of sealing assembly 32 is overlaid with a second end 45 of pull tab member 46 effectuating an adhesive seal over aperture 56 and maintaining the milk 25 within milk bladder 34. When it is desired to intermix the cereal 23 and milk 25, the first end 44 of pull tab 46 on front wall 19 is engaged and pulled perpendicular to front wall 19 thus disengaging the second end 45 of pull tab 46 and releasing the milk 25 from milk bladder 34 through aperture 56 and into lower compartment 26 to intermix with the cereal 23.

In a second embodiment of the milk bladder 34 and sealing assembly 32, there would be no aperture in milk bladder 34. Rather, a portion of milk bladder 34 would comprise a frangible membrane 35 in alignment with aperture 56 in sealing assembly 32. The second end 45 of pull tab member 46 would effectuate an adhesive seal over aperture 56 and be in intimate contact with the frangible membrane. Therefore when the first end 44 of pull tab 46 is engaged and pulled perpendicularly to the front wall 19, the second end 45 of pull tab 46 would release from sealing means and simultaneously rupture or remove the frangible membrane 35.

FIGS. 7 through 11 illustrate the manner of operation. The cereal package 10 is positioned on its bottom wall 16. The first end 44 of pull tab 46 is engaged and pulled vertically away from front wall 19. Pressure is then applied to top wall 14 compressing the corrugated rib portion 20 and causing the milk 25 in milk bladder 34 to pass through aperture 56 and into lower compartment 26 and intermix with the cereal. The cereal package 10 is then placed on its rear wall 18 and pop off cap 40 is removed and the tamper proof seal 42 is then removed allowing access to the lower compartment 26 and the intermixture of cereal 23 and milk 25. As illustrated in FIGS. 10 and 11, a foldable, disposable spoon 70 can be engaged within the pop off cap 40 for use in consumption of the cereal.

The structure of the cereal package disclosed herein and the embodiment of utilizing a milk bladder and pull tab sealing means for the milk provides for easier production of the package. The milk producers can insure the sanitary aspects of the milk and the filling of the milk bladder and its sealing utilizing the pull tab and sealing assembly. Milk bladder can then be automatically positioned within upper compartment 24 and oriented correctly prior to the cereal package 10 being sealed at its top 14.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A packaging assembly for milk and cereal that are to be intermixed, comprising:
a container defined by side walls, a top wall and a bottom wall and an impervious inner wall extending across the width of the container to define an upper and lower compartment within said container, said upper compartment containing a liquid in the form of milk to be intermixed with a solid in the form of cereal in said lower compartment, said inner wall having an aperture therethrough covered with an impervious, frangible membrane extending across said aperture, said impervious, frangible membrane secured to a pull tab extending outwardly from one of said side walls of said container for the selective removal of said impervious, frangible membrane, said lower compartment having an access aperture located along one of said side walls which is initially sealed and capable of being opened to provide access to the interior of said lower compartment to allow consumption of said milk and said cereal, said side wall portions having a compressible portion which is deformed upon application of pressure to said top wall of said upper compartment so that said milk in said upper compartment flows through said aperture after removal of said impervious, frangible membrane.

2. The packaging assembly in accordance with claim 1 wherein said compressible side wall portion is in the form of corrugated ribs.

3. The packaging assembly in accordance with claim 1 wherein said milk has been subject to UHT conditions to allow said milk to be stored unrefrigerated for long periods of time.

* * * * *